United States Patent [19]

Sekido et al.

[11] 4,369,451

[45] Jan. 18, 1983

[54] THERMAL PRINTING DEVICE

[75] Inventors: Yosihiro Sekido; Tutomu Kurihara; Munetada Kazama; Rokuro Homma, all of Tokyo, Japan

[73] Assignee: Oki Electric Industry Co., Ltd., Tokyo, Japan

[21] Appl. No.: 200,484

[22] Filed: Oct. 24, 1980

[30] Foreign Application Priority Data

| | | | |
|---|---|---|---|
| Oct. 30, 1979 | [JP] | Japan | 54-139296 |
| Dec. 7, 1979 | [JP] | Japan | 54-158766 |
| Apr. 23, 1980 | [JP] | Japan | 55-54799 |

[51] Int. Cl.[3] .......... G01D 15/10

[52] U.S. Cl. .......... 346/76 PH; 400/120

[58] Field of Search .......... 346/76 PH, 76 R, 76 L; 400/120; 118/46, 667, 641–643

[56] References Cited

U.S. PATENT DOCUMENTS

| | | | |
|---|---|---|---|
| 1,934,753 | 11/1933 | Wildhaber | 346/76 R X |
| 2,616,961 | 11/1952 | Groak | 346/76 R |
| 3,719,261 | 3/1973 | Heinzer et al. | 346/76 PH X |
| 4,140,907 | 2/1979 | Pba | 346/76 R X |

FOREIGN PATENT DOCUMENTS

| | | | |
|---|---|---|---|
| 54-116248 | 9/1979 | Japan | 346/76 R |
| 1563775 | 4/1980 | United Kingdom | 400/120 |

OTHER PUBLICATIONS

*IBM Technical Disclosure Bulletin,* vol. 14, No. 2, Jul. 1971, p. 504, E. P. Damm, Jr., "Thermal Printer".

*Primary Examiner*—G. Z. Rubinson
*Assistant Examiner*—W. J. Brady
*Attorney, Agent, or Firm*—Berger & Palmer

[57] ABSTRACT

Thermal printing device is disclosed which prints on ordinary paper using an ink which melts when heated but is solid at room temperature.

The device comprises an ink-carrier with level surface which carries ink-layer formed on the surface of itself from ink-molten pool to printing position, means for rotating the ink-carrier, a cylindrical roller with linear uneven surface which is in linear contact with the ink-carrier in perpendicular direction to the lines on the surface, forming vacant ink-pool between the ink-carrier and the cylindrical roller itself, adhering the ink of ink-molten pool on the surface of ink-carrier as an ink-layer in accordance with the rotation of the ink-carrier, means for melting the ink of ink-molten pool, means for generating thermal patterns for re-melting solid ink-layer by generating thermal patterns in accordance with the printing signal at the printing position corresponding to printing paper and means for controlling the feeding of printing paper, forcing the paper to contact with the ink-carrier so that the ink patterns may be transcribed on the printing paper.

By these means, the ink can controllably and adequately be solidified and melted. Thereby, the ink-layer can be evened and printing quality can be improved. In addition, the device itself can be simplified.

10 Claims, 12 Drawing Figures

THERMAL PRINTING DEVICE

BACKGROUND OF THE INVENTION

A. Field of the Invention

The present invention relates generally to printing device, or more particularly relates to thermal printing device which prints on ordinary paper using an ink which melts when heated but is solid at room temperature.

B. Description of Prior Art

Various kind of printing devices are used for data processing in computer, facsimile and copying machine. Many efforts are directed to improve the device from the standpoint of its dimensions, printing speeds, noises and electric consumptions. Printing devices may be classified into two kinds, one of them is impact-type printer which effects printing by mechanical impacts, the other being non-impact-type without such mechanical impacts. Although the impact-type printer may have some advantages, the non-impact-type one is developing in recent years, because of its low noise and freedom of printing elements.

Non-impact-type printer may further be classified into inkjet-type printer, electrostatic-type printer and thermal printer. The inkjet-type spouts liquid ink in the form of minute ink drops from its nozzle and the ink drops are adhered onto printing paper as dots to effect printing. Electrostatic printer comprises a drum which can be charged electrostatically. Toner, i.e. a particle ink, is adhered onto the drum and is transcribed and fixed onto the printing paper to effect printing. Thermal printer, as is already mentioned, effects printing by using an ink-layer of heat-melting ink which can easily be transcribed onto the printing paper.

Characteristics advantage of these non-impact-type printers is that an ordinary paper can be used for printing. The ordinary paper without specific processing can easily be furnished without troublesome management of it.

By the way, inkjet-type printer has disadvantage that the jet nozzle is frequently choked, accordingly, it is difficult to effect printing steadily for a long time. It is necessary for the electrostatic printer to fix the electrostatic image after transcribing the charged particles, accordingly, fixing device is indispensable. For this reason, the printer tends to be large in its dimension and be expensive. Contrary to these printers, thermal printer has no such disadvantages.

In FIG. 1, a prior art terminal printing device is shown in which numeral 10 indicates an ink-roller on the surface of which minute uneveness is formed by attaching a foam-rubber or minute fibers on a rubber roller. Numeral 12 indicates a reforming roller of metal rod and the ink roller 10 and reforming roller 12 rotate in the direction of an arrow 14, being in contact with each other. The reforming roller 12 is heated by a heater 16 which is in spaced relationship with the roller 12 and the ink is melted which is in an ink pool 18 provided in contact with the ink roller 10. The ink is a mixture of coloured particle, printing medium such as paraffin compound and dispersion elements. The ink is solid below room temperature, but it melts rapidly when heated over predetermined degree of temperature and flows freely. The melted medium, i.e. the paraffin compound, can soak in the ordinary paper. The melted ink permeate into and adheres to the uneveness on the surface of ink-roller 10 and solidifies into ink-layer 20 in compliance with the fall of temperature. Numeral 22 indicates a thermal head with numerous minute heat elements inside. The thermal head is pressed toward the ink-roller 10 with a printing paper 26 with the aid of spring means 24 at the pressure of 200 to 1,000 gram/cm$^2$. Numeral 28 indicates a paper feed roller and numeral 30 indicates a pulse motor for driving the paper feed roller 28.

In operation, the heat elements of thermal head 22 generate heat when a printing signal is fed to the thermal head 22 for melting the ink-layer 18 of ink roller 10 from the back of printing paper 26. The melted ink is then transcribed onto the surface of printing paper 26 as series of dots. After printing dots on the paper 26, the paper feed roller 28 is driven by pulse motor 30 to feed the paper 26 in the direction of an arrow 32 by a pitch for successively printing dots on the paper 26. The ink roller 10 is rotated in the direction of an arrow 14 by the frictional force from the paper 26 when the paper 26 is fed in the direction of an arrow 32. The surface of ink roller 10 needs to be remedied by supplying the ink from the ink pool 18, because uneveness of ink layer 20 occurs after printing dots on the paper 26.

In the above-described thermal printing device, dominant factors which decides printing quality are eveness of ink-layer and timely solidification and melting of ink. In other words, it is difficult to flatten the ink-layer, because the ink roller on which the ink-layer is formed has uneveness on its surface. Accordingly, the ink-layer does not uniformly come into contact with the thermal head, thereby the heat is not so well conducted to the ink-layer from the thermal head. Following that, the ink-layer can not sufficiently be melted, consequently the ink is not well transcribed onto the printing paper and the printing quality is degraded. Further, the printing quality becomes worse in case the solidification and melting of ink are not adequately conducted, resulting lack of dots and spotted paper.

Above all, the ink roller is the most important factor to obtain flattened ink-layer. Accordingly, the surface of ink-roller should be polished or numerous minute dents should be distributed uniformly all over the surface. But, such forming needs excellent technique and costs time and effort. Even if the surface is polished, the thickness of ink-layer becomes thinner, because the ink roller comes in close contact with the reforming roller. According to the experiments by the inventors of the present invention, the most suitable thickness of ink-layer amounts approximately from 20 to 35 microns. But, the thickness of ink-layer obtained by the combination of rubber ink roller and reforming roller amounts less than 10 microns, being insufficient for printing. Furthermore, it is almost impossible to increase the thickness of ink-layer by providing a gap between the ink roller and reforming roller due to the difficulty of levelizing the thickness. On the top of it, there are other problems to be solved in order to solidify and melt the ink timely, such as the distance between from the ink pool and the printing position and means for melting the ink.

SUMMARY OF THE INVENTION

Accordingly, it is a main object of the present invention to obtain thermal printing device of improved printing quality.

It is another object of the invention to levelize the ink-layer.

It is further object of the invention to solidify and melt the ink timely.

It is another object of the invention to reduce the dimension of the device and simplify it.

To achieve the objects, thermal printing device according to the present invention comprises an ink-carrier with level surface which carries ink-layer formed on the surface of itself from ink-molten pool to printing position, means for rotating the ink-carrier, a cylindrical roller with linear uneven surface which is in linear contact with the ink-carrier in perpendicular direction to the lines on the surface, forming vacant portion for ink-pool between the ink-carrier and the cylindrical roller itself, adhering the ink of ink-molten pool on the surface of ink carrier as an ink-layer in accordance with the rotation of the ink-carrier, means for melting the ink of ink-molten pool, means for generating thermal patterns for re-melting solid ink-layer by generating thermal patterns in accordance with the printing signal at the printing position corresponding to printing paper and means for controlling the feeding of printing paper, forcing the paper to contact with the ink-carrier so that ink patterns may be transcribed on the printing paper.

These and other objects of the invention will become more readily apparent from the ensuing specification when taken with the drawings.

DETAILED DESCRIPTION OF PREFERRED EMBODIMENTS

Figure 1:
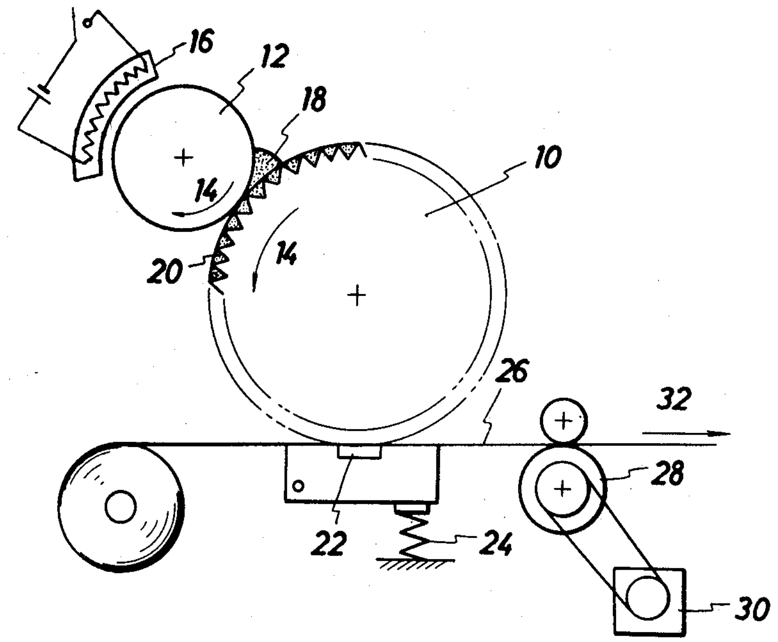
FIG.1 PRIOR ART
FIG. 1 is a schematic side elevation showing prior art thermal printing device.
Figure 2:
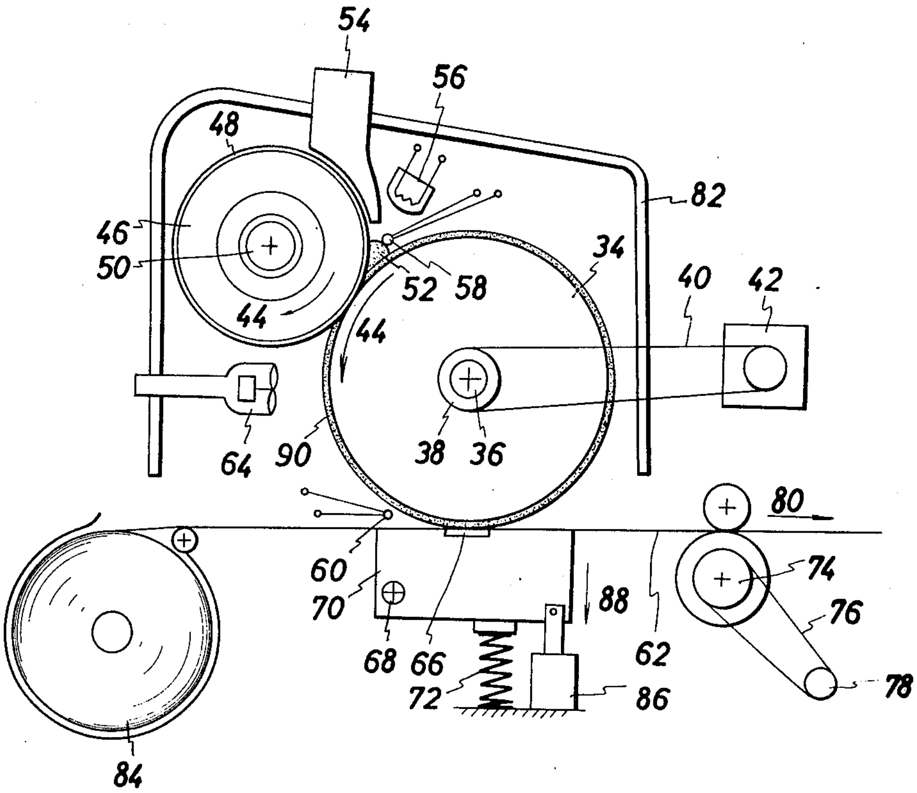
FIG. 2 is a schematic side elevation showing an embodiment of thermal printing device according to the present invention.

Referring now to FIG. 2, numeral 34 indicates an ink roller for ink carrier, made of a heat-proof elastic body such as silicone rubber or neoprene rubber. The ink roller 34 is supported by an axis 36 which can be rotated by a drive motor 2 by way of one-way clutch 38 and a belt 40. The motor 42 drives the ink roller 34 in the direction of an arrow 44. Numeral 46 indicates a reforming roller which corresponds to a cylindrical roller on the surface of which an ink-layer 90 is formed when the reforming roller 46 comes in contact with the ink carrier.

Figure 3:
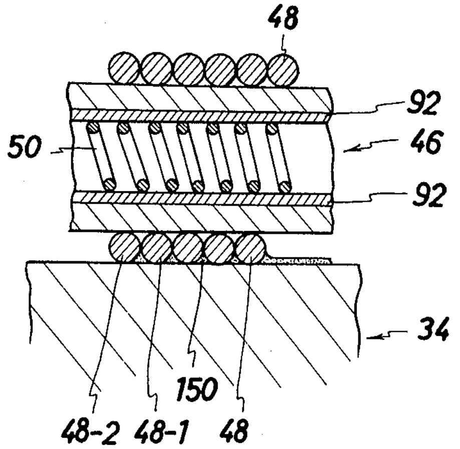
FIG. 3 is a partial sectional view of FIG. 2.

As shown in detail in FIG. 3, fine wire 48 is wound around the reforming roller 46, the coils of the fine wire being in close contact with each other. Preferably, the wire 48 may be about 150–250 microns in diameter in order to obtain the ink-layer 90 about 20–35 microns thick. Electric resistance wire 50 such as nichrome wire is provided inside the reforming roller 46. The electric resistance wire 50 generates heat by an electric current from an electric voltage source not shown to warm the ink of ink-molten pool 52. The reforming roller 46 is constantly in contact with the ink roller 34 at the pressure of 200–1,000 gram/$cm^2$ and is rotatably supported. The reforming roller 46 is rotated when the ink roller 34 rotates in the direction of an arrow 44 with the aid of drive motor 42. Numeral 54 indicates an ink-supplier for supplying an ink to ink-molten pool 52 between the ink roller 34 and reforming roller 46. The ink-molten pool 52 is heated by heating means 56 such as an electric heater, lamp or hot air. The heating means 56 heats the ink-molten pool 52 which is also heated by the electric resistance wire 50 of reforming roller 46 and the temperature of ink-molten pool 52 is controlled by measuring it with a heat sensor 58. Numeral 60 indicates a heat sensor for measuring the temperature of ink roller 34 and the heat sensor 60 is provided adjacent to the ink roller 34 near the printing paper 62. Numeral 64 indicates a fan for cooling the ink roller 34 and the fan 64 is situated in front of the ink roller 34. Numeral 66 indicates a thermal head for generating thermal patterns and the thermal head 66 is situated at a base 70 which is supported by a rotatable supporting point 68. The base 70 is pressed toward the ink roller 34 by a spring 72, thereby, the thermal head is pressed against the ink roller 34 with printing paper 62. Numeral 74 indicates a paper feed roller which is associated with a pulse motor 78 by way of a belt 76 and the printing paper 62 is forwarded in the direction of an arrow 80. Besides, numeral 82 indicates a dust cover, numeral 84 indicates stock means for printing paper 62 and numeral 86 indicates suction means by which the base 86 can be moved in the direction of an arrow 88.

In operation, the electric resistance wire 50 generates heat when the electric voltage is applied to the wire 50 inside the reforming roller 46 and then the ink-molten pool 52 is heated. Even when the electric voltage is applied to the reforming roller 46, the thermal head 66 is still pulled in the direction of an arrow 88 by suction means 86, as long as printing signal is not fed to the thermal head 66 for generating heat patterns. Accordingly, the thermal head 66 is spaced apart from the ink roller 34. At the beginning of applying electric voltage on the electric resistance wire 50, it takes much time to melt the ink of ink-molten pool 52 completely, because the amount of generated heat is small. In order to shorten such warming-up time, the temperature of ink-molten pool 52 is perceived by sensor 58 and the heater 56 may be activated if the temperature arrives only below the melting point of ink. Then, the ink is heated to melt it completely by the heater 56 and reforming roller 46. Once the ink is sufficiently melted, then the heater is turned off and the ink is then heated only by the reforming roller 46 and kept melted. While the ink roller 34 has been rotated in the direction of arrow 44 by drive motor 42 during the warming-up time, and also the reforming roller 46 which is constantly in contact with the ink roller 34 rotates in the direction of arrow 44. Then, the ink of ink-molten pool 52 is adhered onto the surface of ink roller 34 with the aid of reforming roller 46 to form the ink-layer 90 the detail of which will be described hereinunder.

The process of forming the ink-layer 90 will be detailed with reference to FIG. 3. The figure shows how the ink-layer 90 is formed on the surface of ink-roller 34 with the aid of reforming roller 46 which has electric resistance wire 50 inside and also spirally wound wire 48 outside. Adjacent wires 48-1 and 48-2 are in contact with the ink roller 34 of elastic body. A vacant portion 150 for ink pool is formed between the ink roller 34 and spirally wound wires 48-1, 48-2, notwithstanding that the ink roller 34 is in contact with reforming roller 46, because the cross-section of these wires 48-1, 48-2 are round. In other words, linear unevenness is formed on the surface of reforming roller 46, because the wire 48 is wound round the surface and the wire 48 is in linear contact with the ink roller 34. The ink of ink-molten pool 52 permeates into the vacant portion 150 and the ink passes through the contact surface and it adheres onto the surface of ink roller 34 and wire 48. But, almost all the ink adheres onto the ink roller 34, because the temperature of reforming roller 46 which has heat element inside is higher than that of the ink roller 34. The ink adhered onto the ink roller 34 joins together, after leaving from the wires 48-1, 48-2 in accordance with the rotation of ink roller 34, with the ink which has already adhered onto the ink roller 34 due to surface tension effect and these processes are repeated all over the axial direction of ink roller, thereby, the leveled ink-layer 90 of desired thickness is formed. The thickness of ink-layer 90 depends on the quantity of ink which permeates into the vacant portion between the ink roller 34 and wires 48-1, 48-2, so the optimum thickness can be obtained for printing by varying the diameter of wire 48. As experimentally determined, the optimum thickness of ink-layer 90 amounts to 20–35 microns, accordingly, the recommendable diameter of the wire 48 is about 150–250 microns. Besides, numeral 92 in FIG. 3 indicates an insulator which is needed in case the reforming roller 46 is made of a conducting material such as a metal.

The printing signal or the predicting signal is fed to the thermal printing device after forming the ink-layer 90 on the surface of ink roller 34. Then, the drive motor 42 is stopped and, thereby, the rotation of ink roller 34 is stopped. Simultaneously, the suction means 86 fails to function, thereby, the thermal head 66 is pressed with the printing paper 62 against the ink roller 34 at the pressure of 200–1,000 gram/cm$^2$ by the spring 72. The thermal head 66 is turned on by the printing signal. The thermal head comprises a set of electric resistance elements which generate heats by applied electric voltages and the ink-layer 90 is heated by the heats. The heated ink melts and is transcribed in dots on the surface of printing paper 62. The transcribed ink dissipates its heat in a short period of time and re-solidifies. But, the ink soaks, as detailed, in the printing paper 62 before its re-solidification. After the printing is finished, the pulse motor 78 is driven in synchronism with the transmission of electric voltages to the thermal head 66, thereby, the paper feed roller 74 is pulsed to rotate slightly. Once the paper feed roller 74 rotates, the printing paper 62 is slightly fed in the direction of an arrow 80 and the electric current is transmitted to the thermal head 66 in order to repeat printing. These processes are repeated in many times, thereby, characters or picture elements are printed on ordinary printing paper 62 in dots.

By the way, small concavities will result in the ink-layer 90 after the ink of ink-layer 90 is transcribed to the printing paper 62. Such concavities will cause improper contact with the thermal head 66 in next printing or irregular printing. Accordingly, it is neccessary to reform such small concavities on the ink-layer 90 and recover flattened ink-layer 90. Following is a description for such reforming process of ink-layer 90. The drive motor 42 for rotating the ink roller 34 stops when the printing is effected, accordingly, the ink roller 34 can not be rotated. But, the ink roller 34 pulses to rotate in the direction of arrow 44 with the printing paper 62 with the aid of friction force of the printing paper 62 when the paper 62 is fed in the direction of arrow 80 after printing is over. By repeating such pulsation, the concavity of ink-layer 90 will reach the ink-molten pool 52 and it is reformed just like the process detailed above. Besides, the reaction force will not effect upon the rotation of ink roller 34 in the direction of arrow 44, since the ink roller 34 comprises the one-way clutch 38.

By the way, it is indispensable that the ink-layer 90 has been solidified until it reaches the position where it comes into contact with the thermal head 66, because the printing quality will be degraded due to spotted inks which should not be printed on the paper in case the ink-layer 90 has not sufficiently been solidificated. Thus, it is designed to detect the temperature of ink roller 34 by sensor 60. The fan 64 is activated to cool the ink-layer 90 in case the temperature of ink roller 34 is higher that that of the melting point of ink and the ink-layer 90 solidifies timely and completely.

As is described in detail, thermal printing device according to the present invention can produce the level ink-layer of optimum thickness, as the ink-layer is formed on the surface of ink roller with the aid of spirally wound wires. The ink-layer can solidify completely and the printing quality can be improved, since the temperature of ink roller is controlled by the cooling fan. Moreover, the warming-up time can be shortened, because the ink of ink-molten pool is melted by the electric resistance wire inside the reforming roller and the heater. The reforming roller may be shaped polygonal and be fixed. Narrow spaced grooves of fine lines may be formed on the surface of reforming roller in place of the wires.

Figure 4:
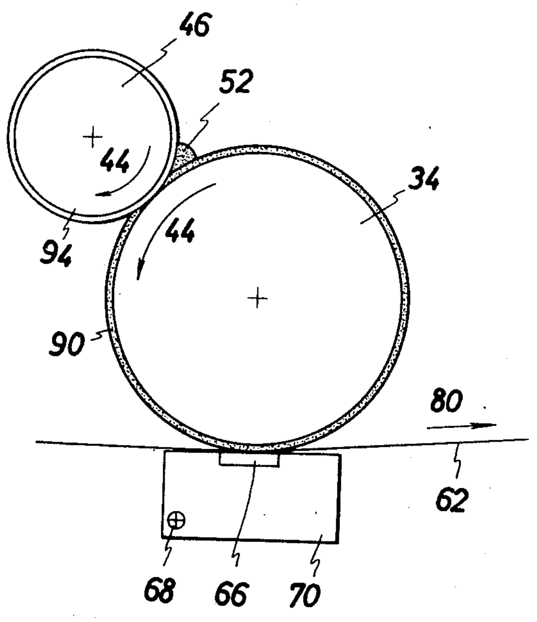
FIG. 4 is a partial sectional view showing another embodiment of the present invention.

Referring now to FIG. 4, shown other embodiment of the invention in which the reforming roller 46 is made of heat-resisting rod such as a metal rod around which an electric resistance wire 94 such as nichrome wire is spirally wound through insulating material. By these provisions, electric resistance wire inside the reforming roller 46 can be dispensed with and the flattened ink-layer 90 of optimum thickness can be formed. It may be designed to constantly cool the ink-layer by controlling the fan 64 in compliance with the measurement of sensor 60. Further, a cooling roller, not shown, may be provided to solidify the ink-layer 90 or an electronic refrigiration elements employing Peltier effect may be used for cooling the ink roller 34. Flanges may be provided on both sides of reforming roller 46 so that the ink of ink-molten pool 52 may not flow over the reforming roller 46 from both sides of it.

Figure 5:
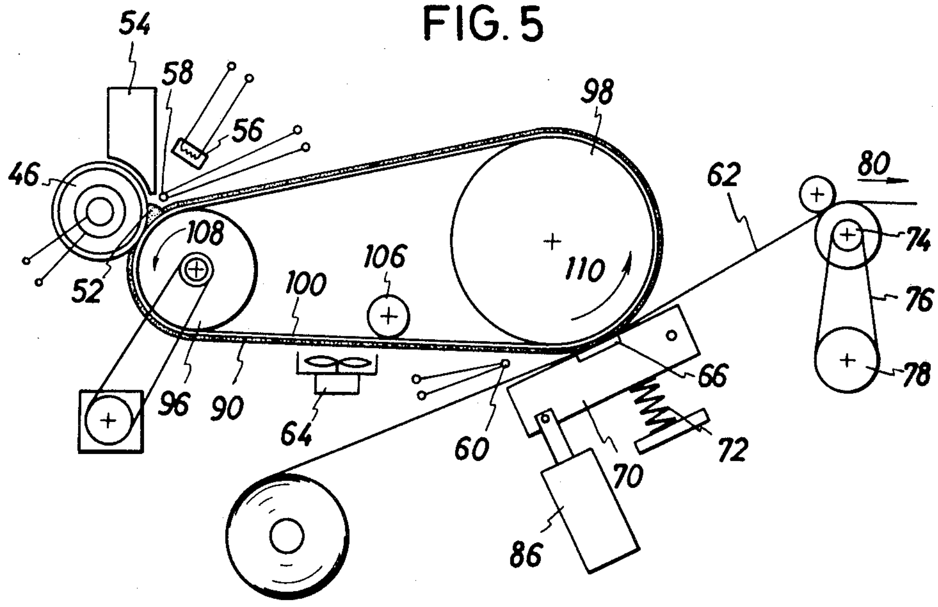
FIG. 5 is a schematic side elevation of other embodiment, employing an ink-belt.
Figure 6:
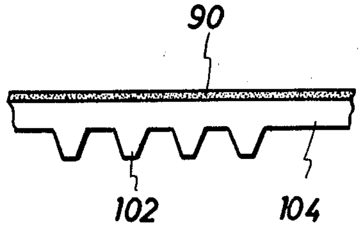
FIG. 6 is a partial sectional view showing an example of ink-belt.

Referring to FIG. 5, shown another embodiment of the invention in which an endless belt 100 is adopted for ink-carrier, the endless belt 100 being extended between a drive pulley 96 and a driven pulley 98, while the ink roller 34 being employed for the ink-carrier in the embodiment of FIG. 2. The endless belt 100 is made of a heat-resisting rubber or a synthetic resin. Preferably, a timing belt 104 with teeth portion 102 inside may be employed and corresponding teeth portion should be formed on drive pulley 96, driven pulley 98 and an idling pulley 106. By these provisions, the endless belt can be fed exactly in accordance with the rotation of drive pulley 96 (see an arrow 108) and driven pulley 98 (see an arrow 110). Of course, the endless belt may be a flat one. The reason why the endless belt 100 is adopted for ink-carrier is as follows.

When the ink-layer 90 is formed, the temperature of ink-molten pool 52 is higher than that of the melting point of ink. The temperature of ink must be lowered to solidify the ink-layer 90 before the ink-layer 90 comes in contact with thermal head 66. The printing paper will be spotted and the printing quality be degraded if the ink roller 90 has not completely been solidified. To prevent the degradation of printing quality, the ink-layer 90 is solidified by cooling the ink roller 34 by the fan 64 in the foregoing embodiment. By these provisions, however, the distance from the ink-molten pool 52 to the thermal head 66 must be prolonged by enlarging the diameter of ink roller 34 or the fan with larger amount of blast be employed to solidify the ink-layer completely, thus enlarging the dimension of the device. To cope with these problems, the endless belt 100 is adopted in place of ink roller 34 in the present embodiment to assure sufficient cooling distance to solidify the ink-layer 90. According to the embodiment, temperature control of endless belt 100 can be done without difficulty and printing quality can be improved by solidifying the ink-layer 90. The processes of forming and reforming the ink-layer 90 and printing function are the same as the embodiment of FIG. 2, accordingly, the description on the processes are omitted.

Figure 7:
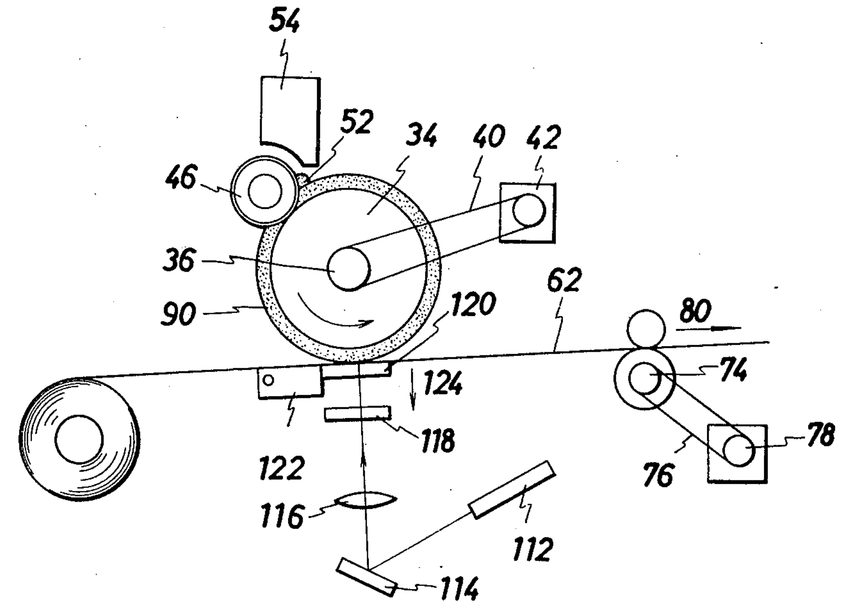
FIG. 7 is a schematic side elevation showing an embodiment in which a laser beam is employed as a means for generating thermal patterns.

In above-said embodiments, the thermal head is employed for generating thermal patterns to melt the ink-layer. However, heat ray sources such as laser beam, LED array and a tungsten-filament lamp may be adopted for means for generating thermal patterns from the standpoint of resolution of picture elements, printing speed and multi-colour printing the details of which will be described hereinunder. In FIG. 7, shown an embodiment in which laser beam is adopted for means for generating thermal patterns. In the figure, numeral 112 indicates a laser beam source for melting the ink-layer 90 and numeral 114 indicates scanning means for scanning the laser beam. Numeral 116 generally indicates lens system which comprises a collimating lens for obtaining minute beam spot, a converging lens for converging flux of beam, and a scanning lens for correcting the deflection. Numeral 118 indicates means for making the laser beam parallel which are provided for entering the laser beam perpendicular to all printing position, since the angle of incidence of the laser beam to pressing means 120 differs in accordance with printing position in case the laser beam is scanned only by scanning means 114 in the axial direction of ink roller 34. Numeral 120 indicates pressing means of printing paper, made of heat ray permeable glass such as cold mirror or SELFOC lens array or glass fiber bundle, being attached to rotatable support means 122. The pressing means 120 are provided for pressing the printing paper 62 against the ink-layer 90 around the ink roller 34. The pressing means 120 fall down in the direction of an arrow 124 in case the printing is not effected, but, it rotates in counterwise direction of the arrow 124 to press the paper against the ink-layer 90 when the printing signal or predicting signal is fed.

Figure 8:
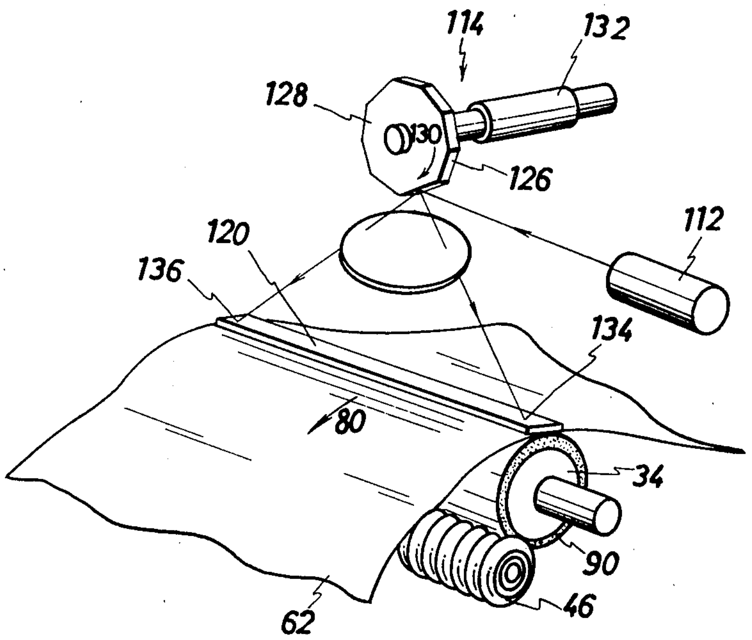
FIG. 8 is a schematic perspective view showing scanning means which is employed in the embodiment of FIG. 7.

In operation, the ink roller 34 rotates in the direction of arrow 80 with the aid of drive motor 42 when the printing signal is not fed and, thereby, the ink-layer 90 is formed on the surface of ink roller 34. The drive motor 42 and the ink roller 34 stop when the printing signal is fed to the device and then the laser beam is emitted from the laser beam source 112. The laser beam is then reflected by scanning means 114 and, converged by the leans system 116, arrives at beam adjusting means 118. The laser beam is adjusted by the means 118 so that all beams may be perpendicular to the ink roller 34 at all printing position. Thereafter, the laser beam reaches the ink-layer 90 by way of pressing means 120 and printing paper 62. The ink of the exposed position of ink-layer 90 melts and the melted ink adheres on the printing paper 62 in dots. At the moment, the printing paper 62 is pressed against the ink-layer 90 by pressing means 120, thereby, the ink is completely transcribed on the printing paper 62. The pressing means is, as described before, heat ray permeable, accordingly, the laser beam can freely pass through the pressing means 120 which will not be heated. A line of dots are printed by scanning the laser beam in the axial direction of ink roller 34 by scanning means 114 and the detail of scanning means 114 will be described hereinunder with reference to FIG. 8. The scanning means 114 comprise a rotatable mirror 128 with a plurality of mirror surfaces 126 and a motor 132 by which the mirror 128 is rotated in the direction of an arrow 130. The mirror surface 126 which comes to the facing relationship to the laser beam source 112 reflects the laser beam in order to scan the beam from points 134 to 136 on the paper 62. In other words, each mirror surfaces 126 scan the laser beam from points 134 to 136 one time as the mirror 128 is rotated by the motor one time. When the printing of a line of dots is finished, the printing paper 62 is fed by one pitch by paper feed roller 74 in the direction of arrow 80 and the laser beam restores to its original position 134 by scanning means 114. Such actions are repeated in succession for printing. Besides, there are some methods for modulating the laser output such as the one to directly control the discharge current of laser beam source 112 or the other to employ the ultrasonic modulator. Moreover, the printing speed will be increased by providing a plurality of laser beam sources 112 along the axial direction of ink roller 34.

Figure 9:
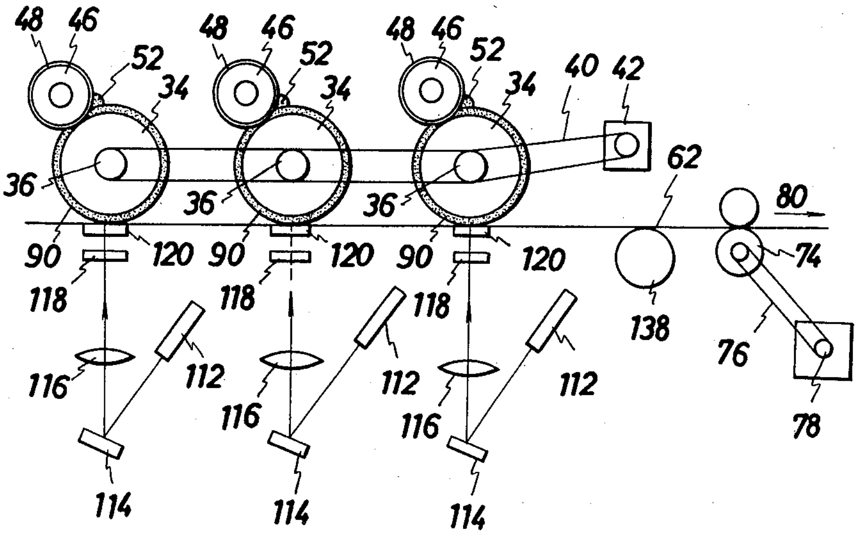
FIG. 9 is a schematic side elevation showing further embodiment of the invention.

Referring now to FIG. 9, shown another embodiment of the invention in which a plurality of ink rollers 34 are provided along the feeding direction of printing paper 62 for multi-colour printing. In the embodiment, the colours of each ink-layers 90 differ with each other and the position control of dots of different colours is achieved by spacing each ink rollers in appropriate times the line pitch in synchronism with the pulse motor 78. For multi-colour printing, three primary coloured inks of magenta, cyanic and yellow are used and they are heated and mixed by the heater 138 which is provided on the way of feeding direction of printing paper 62. In this case, the temperature of the heater 138 may be set a little higher than the melting point.

Figure 10:
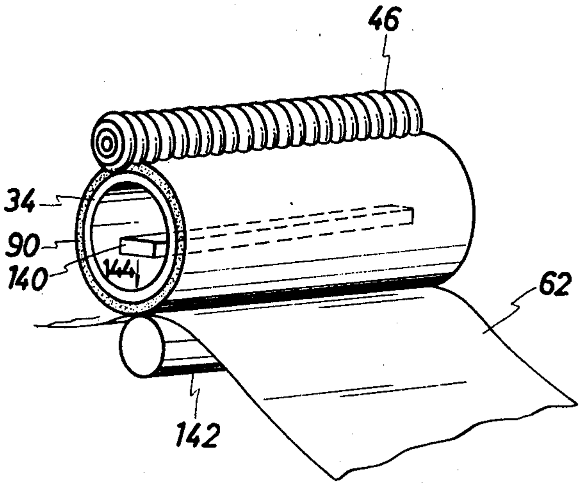
FIG. 10 is a schematic perspective view showing an embodiment in which means for generating thermal patterns is provided inside the ink-roller.
Figure 11:
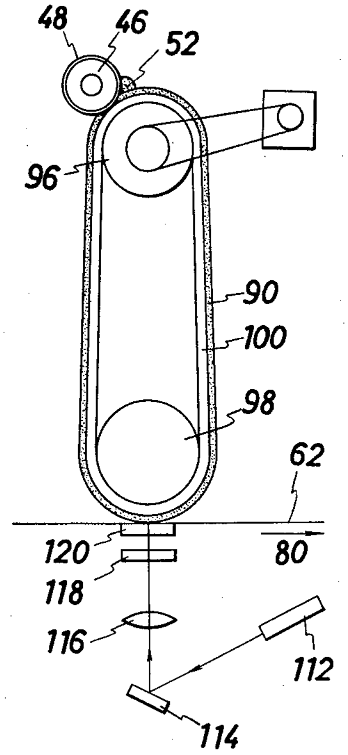
FIG. 11 is a schematic side elevation showing an embodiment in which means for generating thermal patterns are provided outside the ink-belt.
Figure 12:
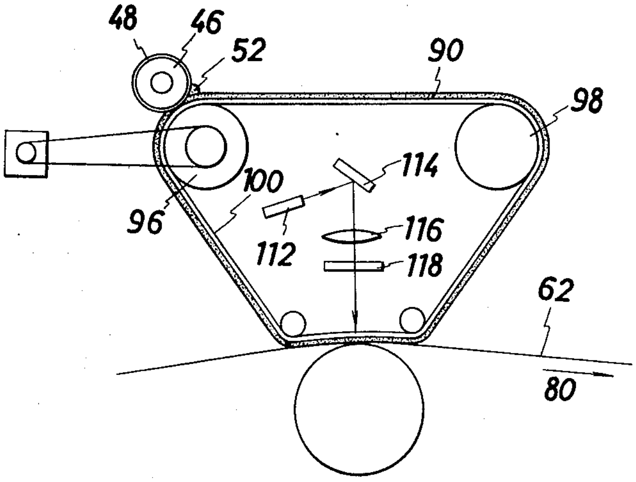
FIG. 12 is a schematic side elevation showing an embodiment in which means for generating thermal patterns are provided inside the ink-belt.

In the above-described embodiments, the heat ray is emanated from the outside of ink-roller 34. On the contrary, LED array 140 corresponding to heat ray source are provided inside the ink roller 34 in the embodiment of FIG. 10. The cylindrical ink roller 34 consists of a heat ray permeable material such as a cold mirror and the printing paper 62 is introduced between the ink roller 34 and platen 142. The LED array 140 inside the ink roller 34 emanate beams in the direction of an arrow 144 to heat the ink-layer 90 on the surface of ink roller 34, thereby, the ink melts and is transcribed onto the printing paper 62. The endless belt 100 may be used as shown in FIGS. 11 and 12 in place of ink roller 34 and the laser beam may be emitted from the in- or outside of the endless belt 100. The endless belt 100 may be a timing belt with teeth portion or it may consist of sheet or film of rubber, synthetic resin or glass fiber.

Obviously, many modifications and variations of the present invention are possible in the light of the above teachnings and it is therefore understood that within the scope of the invention, the concept may be practised otherwise than specifically described.

What is claimed is:

1. A thermal printing device which prints on ordinary paper using an ink which melts when heated but is solid at room temperature, wherein the improvement comprises:

an ink-carrier having a smooth surface which carries an ink-layer formed on said surface from an ink-molten pool to a printing position, means for rotating said ink-carrier, a cylindrical roller having a linear uneven surface, said linear uneven surface being in linear contact with said ink-carrier forming a space for catching ink from the ink-molten pool to form a vacant ink-pool between said ink-carrier and said cylindrical roller, said linear uneven surface around said roller being formed by a cylindrical body and wire means wound around the surface of said cylindrical body with each wind being adjacent the next wind, the ink of ink-molten pool adhering to the surface of said ink-carrier forming an ink-layer in accordance with the rotation of said ink-carrier, means for melting the ink of said ink-molten pool, means for generating thermal patterns for re-melting the solid ink-layer by generating thermal patterns in accordance with the printing signal at the printing position corresponding to printing paper, and means for controlling the feeding of printing paper, forcing said paper to be in contact with said ink-carrier so that ink patterns may be formed on said printing paper.

2. A thermal printing device according to claim 1, wherein said cylindrical roller comprises an electric resistance wire provided inside said cylindrical body, the ink of said ink-molten pool being melted by heat generated by said electric resistance wire located within said cylindrical roller.

3. A thermal printing device according to claim 1, wherein said closely wound wire means comprises a fine wire spirally wound around said cylindrical body.

4. A thermal printing device according to claim 1, wherein said wire means comprises electric resistance wires which are closely wound around the surface of said cylindrical body, said electric resistance wires being heated to melt the ink of ink-molten pool.

5. A thermal printing device according to claims 1 or 3, wherein the contact between said ink carrier and said cylindrical roller is substantially perpendicular to the planes of the contacting surfaces.

6. A thermal printing device according to claims 1 or 3, wherein said ink-carrier comprises an elastic cylindrical roller.

7. A thermal printing device according to claims 1 or 3 wherein said ink-carrier comprises an elastic endless belt.

8. A thermal printing device according to claim 1, wherein said means for generating thermal patterns comprises a set of electric resistance elements for generating heat by selectively applying electric voltages.

9. A thermal printing device according to claim 1, wherein said means for generating thermal patterns comprises heat ray sources.

10. A thermal printing device according to claim 1, wherein said means for generating thermal patterns comprises laser means.

* * * * *